United States Patent
May et al.

(10) Patent No.: US 7,188,733 B2
(45) Date of Patent: Mar. 13, 2007

(54) SCREENING DEVICE, SUCH AS A SCREEN CYLINDER, AND METHOD OF MANUFACTURE OF THE SCREENING DEVICE

(75) Inventors: Jonathan P. May, Worcestershire (GB); Tim Wood, Melbourn (GB); John Stephenson, Cherry Hinton (GB); Jari Jurvanen, Lappeenranta (FI); Jaakko Putkonen, Varkaus (FI)

(73) Assignee: Advanced Fiber Technologies (AFT) Trust, Montreal (CA)

( * ) Notice: Subject to any disclaimer, the term of this patent is extended or adjusted under 35 U.S.C. 154(b) by 22 days.

(21) Appl. No.: 10/653,411

(22) Filed: Sep. 3, 2003

(65) Prior Publication Data

US 2004/0112827 A1 Jun. 17, 2004

Related U.S. Application Data

(60) Continuation-in-part of application No. 10/143,763, filed on May 14, 2002, now abandoned, which is a division of application No. 09/269,904, filed as application No. PCT/FI96/00520 on Oct. 3, 1996, now Pat. No. 6,426,003.

(51) Int. Cl.
*B01D 29/44* (2006.01)
(52) U.S. Cl. .................. 210/490; 210/497.01; 210/498
(58) Field of Classification Search ............... 210/488, 210/498, 499, 497.01, 497.1, 489, 490; 209/392, 209/393, 395; 166/231–234; 29/896.61, 29/896.62; 162/251
See application file for complete search history.

(56) References Cited

U.S. PATENT DOCUMENTS

| 154,391 A | 8/1874 | Hayden |
| 2,963,781 A | 12/1960 | Smith |

(Continued)

FOREIGN PATENT DOCUMENTS

DE 42 24 727 2/1994

(Continued)

OTHER PUBLICATIONS

Reference Drawing A 10152 of CAE ScreenPlates, 1977.

*Primary Examiner*—Matthew O. Savage
(74) *Attorney, Agent, or Firm*—Heslin Rothenberg Farley & Mesiti P.C.; John Pietrangelo

(57) ABSTRACT

A screening device (e.g., screen plate or screen cylinder) is manufactured relatively inexpensively and easily yet has uniform screening openings (e.g., screening slots) even when of a width of less than 0.5 mm. A plurality of wires having first and second sections (the second sections having base portions and of smaller cross-section than the first sections) are mounted substantially parallel to each other, supported by at least one support bar or ring. The bars or rings have slots formed in a first side surface, and a cavity in open communication with the slots in a second side surface. The wires are fixed to the bars or rings by deforming the wires (e.g., by bending a flap, engagement by a reciprocating tool, welding, etc.) within the cavity, or by deformation of the support bar or ring in the cavity. The screen plate or cylinder is preferably used to screen or otherwise treat a cellulose pulp suspension, e.g., by subjecting the first sections of the wires to a flow of pulp with accepts passing through the screening openings.

23 Claims, 9 Drawing Sheets

U.S. PATENT DOCUMENTS

| | | |
|---|---|---|
| 3,716,144 A | 2/1973 | Bartlow |
| 3,805,955 A | 4/1974 | Bixby et al. |
| 3,864,264 A | 2/1975 | Spohr et al. |
| 3,901,801 A | 8/1975 | Bixby |
| 3,923,649 A | 12/1975 | Sparham et al. |
| 4,002,540 A | 1/1977 | Bixby |
| 4,184,950 A | 1/1980 | Bixby |
| 4,693,835 A * | 9/1987 | Arai .......................... 210/777 |
| 4,846,971 A | 7/1989 | Lamort |
| 5,011,065 A | 4/1991 | Musselmann |
| 5,090,721 A | 2/1992 | Lange |
| 5,094,360 A | 3/1992 | Lange |
| 6,426,003 B2 | 7/2002 | May et al. |

FOREIGN PATENT DOCUMENTS

| | | |
|---|---|---|
| WO | WO 99/22064 | 5/1999 |

* cited by examiner

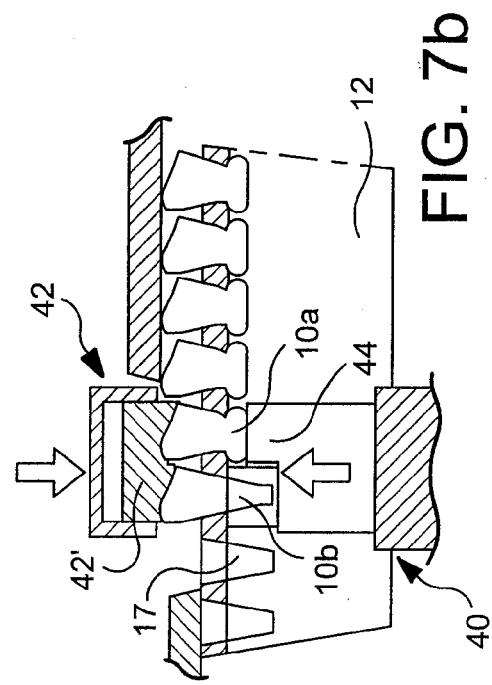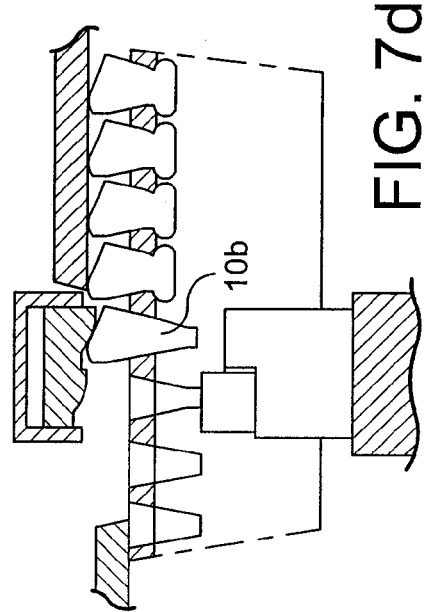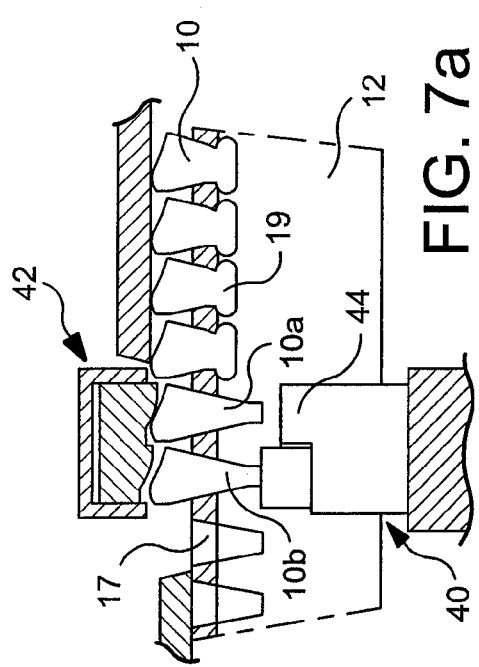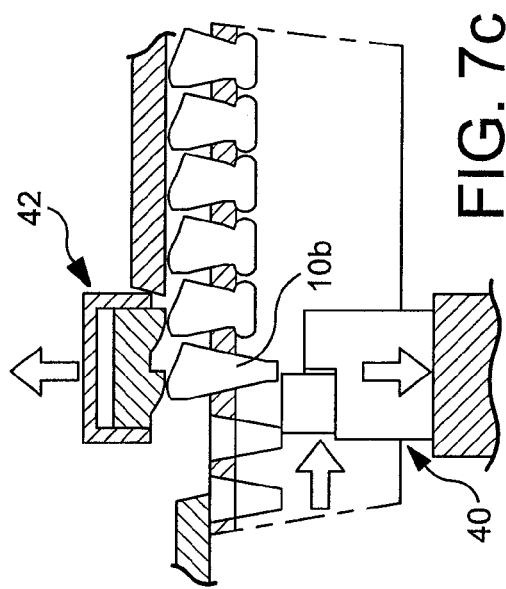

SCREENING DEVICE, SUCH AS A SCREEN CYLINDER, AND METHOD OF MANUFACTURE OF THE SCREENING DEVICE

CROSS-REFERENCES TO RELATED APPLICATIONS

This is a continuation-in-part of U.S. patent application Ser. No. 10/143,763, filed May 14, 2002, now abandoned; which is a divisional of U.S. patent application Ser. No. 09/269,904, filed Aug. 19, 1999, now U.S. Pat. No. 6,426,003; which claims priority of PCT/FI96/00520, filed Oct. 3, 1996, the entire contents of which are hereby incorporated by reference in this application.

STATEMENT REGARDING FEDERALLY SPONSORED RESEARCH OR DEVELOPMENT (NOT APPLICABLE)

BACKGROUND OF THE INVENTION

The present invention refers to a screening device and a method of manufacture thereof as recited in the preamble of appended independent claims. The present invention thereby refers to screening devices, such as screen cylinders or bent or flat screening elements, for screening, filtrating, fractioning or sorting pulp suspensions in pulp and paper making industry or other similar suspensions. The present invention more particularly refers to screening devices of the type comprising a plurality of screen wires positioned at a small spacing parallel to each other, the plurality of screen wires forming a screening surface facing the pulp suspension to be screened and adjacent wires forming screening openings therebetween allowing an accept portion of the pulp suspension to flow therethrough. The screen wires are supported, preferably on the downstream side of the wires, by a support element, such as a support ring or a support bar or a support plate. The screening devices may have various forms, e.g., be flat, bent, cylindrical or conical just to name a few preferred forms.

In known screening devices of this type, the support elements, which form supports for the screen wires, are formed of either solid bars, mainly rectangular or round in cross section, or sheet metal strips bent to V-form or round form, and most typically positioned perpendicular to the screen wires. There is a number of patents discussing this type of screening devices, like for instance, U.S. Pat. No. 3,716,144, U.S. Pat. No. 3,805,955, and U.S. Pat. No. 6,426,003.

The screen wires are generally fastened to the supporting elements by a welding process which gives rise to a number of disadvantages such as variability distortion, thermal stresses and burrs. Especially, when the welding is done on surfaces facing the fiber suspension flow. The heat induced by the welding often cause distortion of the wires and changes in the screening opening width between adjacent wires. It is therefore difficult to get completely uniform screening openings, which means that the efficiency of the screen suffers. Today, when the desired width of screening openings may be as small as 0.1 mm, only minimal distortions are acceptable. The thermal stresses and the burrs may also lead to failure in operation due to the loading on the screening device in the user's process. Such loading may be either in the form of a constant load or a cyclic loading giving rise to failure by fatigue. Burrs may also catch fibers in the suspension, leading to gradual clogging of the screen or filter, or the formation of so called "strings," which are very detrimental in the user's process.

It has also been suggested, e.g., in U.S. Pat. No. 5,090,721 and U.S. Pat. No. 5,090,360, to connect screen wires of a certain "key"-type cross section into recesses, in the support bar, having a similar "keyhole"-type form. By means of bending the supporting bars into rings, the screen wires are clamped into position. This design, thereby, requires the manufacturing of a number of relatively complicated and therefore expensive recesses. Further, it can only be adapted to circular or round screens. In another known screening device, the screen wires are fastened by looping them around support bars. Such a screen construction is strong, but the looping areas around the support bars are locally closing the openings and thereby reducing throughput of the screen. Also the looped areas tend to have cavities and uneven spots which are facing the suspension potentially causing fiber hang-up. The above difficulties tend to result in poor quality of screening or mechanical weaknesses or to high manufacturing costs.

A further problem concerning ordinary wire screen cylinders, the structure of which is such that the screen wires are supported by circumferential rings, whereby the screen wires carry all the axial loading, is the bending of the screen wires under load. The axial loading is due to the fastening of the screen cylinder into the screening apparatus. Normally, the lower end of the screen cylinder is arranged to lye tightly on a flange at the bottom of the screening apparatus, and the screen is bolted via its upper end ring to an upper flange in the screening apparatus. To ensure tight and secure fastening the screen cylinder-is subjected to a certain amount of axial loading. When the screen wires carry this loading, they may start bending as also the radial loading created by the rotor rotating inside the screen cylinder aids in bending the wires.

BRIEF SUMMARY OF THE INVENTION

It is therefore an object of the present invention to minimize the above-mentioned drawbacks and provide an improved screening device and an improved method of manufacturing such device.

It is thereby also an object of the present invention to provide an easily manufactured and assembled screening device without thermally induced distortion of screen wires.

A further object of the present invention is to provide an improved strong screening device with accurate and consistent screening openings, i.e., screening slots.

A still further object of the present invention is to make it easy to manufacture screen cylinders where the screen wires are in a non-axial inclined direction.

Yet a further object of the present invention is to provide an improved method of manufacturing a screening device, so that uniform screening openings, i.e., good tolerances, are provided, whereby screening openings with very small widths may be manufactured.

It is still further an object of the present invention to provide an improved screening device with minimum of burrs or other protruding elements causing accumulation of fibers on upstream side surfaces of support elements.

Thereby a preferred screening device according to the present invention comprises a plurality of screen wires each comprising a first section and a second section opposite said first section, said second section having a base portion; at least one support element having an upstream surface and a downstream surface, a plurality of openings through said element, a plurality of land areas between said openings, a plurality of slots in said upstream surface, and a plurality of grooves in said land areas on said downstream surface in open communication with said slots; and said second sections of said screen wires received by said slots so that said base portions extend through said slots into said grooves, and said wires are supported by said at least one support element so that said wires are substantially parallel to each other and define screening openings therebetween adjacent said first sections thereof; and wherein said wires are fixed to said at least one support element in said grooves.

Accordingly, a method of manufacturing a screening device, according to a preferred embodiment of the present invention includes providing support element in the form of a sheet metal plate having an upstream surface and a downstream surface; providing openings through said sheet metal plate; providing, in optional order, a plurality of slots in the upstream surface of said sheet metal plate, and a plurality of grooves in the downstream surface of said sheet metal plate such that the directions of said slots and said grooves intersect and that said slots open into said grooves; providing a plurality of screen wires each having opposite first and second sections, and a base portion at the second section; inserting the wires in the slots so that the base portions thereof extend into the grooves and the wires are substantially parallel to each other and define screening openings between the first sections thereof; and fixing the wires to the at least one support element substantially within the grooves.

In accordance with a preferred embodiment of the invention the support element is preferably made of a sheet metal plate through which round holes, or openings having an elliptical, triangular, quadrangular, pent angular, heptangular or some other appropriate shape have been machined by milling, drilling, punching etc. In fact, any type of opening ensuring a sufficient open area for the screen will do, as well as any way of machining being capable of making the required openings.

In accordance with another preferred embodiment of the present invention the support element is made of sheet metal strips forming a grid or network. The sheet metal strips are fastened to each other so that the adjacent strips leave openings therebetween. However, later in this specification also this type of support elements is referred to as support element or support plate, as it acts in a similar manner than a sheet metal plate i.e., supporting the screen wires in all directions. It, in other words, gives also axial support unlike ordinary support rings of wire screen cylinders.

In the support element land areas are left between the openings. The support element is further provided with supporting slots or recesses for the screen wires in a first, or so-called upstream surface thereof and running across the support element, said slots or recesses extending to a predetermined depth into the land areas. The second, opposite, so-called downstream surface of the support element is provided with grooves i.e., cavities in a part of the land areas such that the grooves open in the supporting slots or recesses.

The cavity or groove in the land areas of the support elements according to the invention may be made in a U- L- or V-shaped or other similarly shaped cross section. This depends on the shape of the machining tool, and on the positioning of the tool in relation to the land area. Thus, the screen wires are at least on one side of the groove supported to the bottom of the supporting slot or recess. The grooves have a flat or an angled or a curved bottom portion against which the screen wires are deformed and at least one side portion forming an additional support for the screen wire.

In accordance with another preferred embodiment of the invention, the openings in the sheet metal plate are arranged such that the land areas left between the openings, at least in one direction, form continuous and parallel passages across the plate so that the grooves can be easily machined across the plate, too. This ensures that if and when the plate has been rolled into a cylinder, and the screen wires inserted into the supporting slots, the screen wires are easily deformed inside said grooves.

In accordance with a further preferred embodiment of the invention, a part of the land areas in the plate run in such a direction, that after rolling the plate to a cylindrical form they form circumferential passages round the cylinder so that also the grooves machined in the land areas run round the cylinder. Naturally, it is also possible to arrange the land areas, and grooves there along, to run, for instance, spirally round the cylinder. As to the manufacture of the grooves, the grooves may be formed by a variety of techniques including drawing, extrusion, rolling or machining.

The direction of the supporting slots or recesses machined into the land areas left between the openings in the support element can be freely chosen. However, in case the end product is a screen cylinder for pulp and paper industry, the slots or recesses are positioned in the support element such that their direction is substantially axial in the rolled screen cylinder, as it is customary practice to arrange the screening openings (in the form of narrow slots) in screen cylinders of pulp and paper making industry in substantially axial direction. Yet, by means of the present invention, the direction of the supporting slots or recesses can be freely chosen, whereby the direction of the screening openings in the final screen cylinder may, accordingly, be whatever is considered practical. Thus, the present invention allows other the user to choose the direction of the screening openings more freely than is customary.

The supporting slots, which may be formed e.g., by machining, stamping, spark erosion or laser have a spacing determining the position of the screen wires inserted therein and thereby also the width of the screening opening.

The supporting slots or recesses have a form adapted to receive the downstream section of the screen wires. The slots are typically cut perpendicularly into the support element, but may be cut at any appropriate angle into the support element, if the wires are to be supported in an inclined position. Angles between −30° to +30° are considered preferable. The screen wires are fixed to the slots or recesses by local deformation of the material in the downstream section of the screen wires, after assembly of wires into the supporting slots in the support elements.

As to the order in which the slots and grooves are machined in the perforated sheet metal plate, the order can be freely chosen. Thus, a first option is to machine the blind slots first, and the grooves opening into the slots next, but it is also possible to first machine the grooves, and thereafter the supporting slots or recesses, so that they open into the grooves machined earlier. In some cases it may be preferable to machine the slots and/or grooves before making the openings into the sheet metal plate. Thus, the various machining steps of the sheet metal plate can be performed in any feasible order.

When assembling a screen or filter, the downstream section of a screen wire is inserted into the supporting slot in the support element the base portion i.e., the downstream edge of the screen wire protruding through the slot into the cavity, or groove, and preferably intersecting the cavity.

The screen wires are fixed to the support element by deforming the base portion of the downstream section of the wires, so that the deformation prevents the base portion from departing the slot and the wire from being pulled out. Screen wire material encapsulated within the support element cavity is preferably deformed by using mechanical force. The deformed material forms a mechanical joint, which has no burrs, but has good properties of fatigue resistance. The shape of the deformed material determines the ultimate strength of the joint in resisting forces generated by both the screening process and the fastening of the screen to the screening apparatus. The form of the joint also determines the ultimate fatigue resistance of the jointed materials. The shape of deformation may be determined by the tooling used to form the joints. The tool may e.g., have a flat, concave, convex, conical or domed form to cause material to flow in a direction determined to be optimal for the joint in question. Joints may be completed singly or in multiples in parallel screen wires to speed screening device production or ensure stability during processing.

Other tooling may simultaneously be used to support adjacent supporting slots in the support elements to allow maximum force to be applied to the joints being formed, thus ensuring no distortion of adjacent support slots or screen wires occur. The support may be provided by the inserted screen wires being held in position by a clamping force.

According to another embodiment of the present invention, the screen wire is inserted into a supporting slot or recess, whereafter the support element material in the slot or recess area is locally (point wise or sectionally) deformed to press portions of the slot walls against the screen wire portion within the slot or recess. The deformation of the slot or recess is made at chosen locations to prevent the screen wire from being pulled out of the slot or recess. The slot or recess is preferably deformed by a mechanical force, such as pressing or stamping, directed onto the upstream side surface of the support element. The mechanical force is located so as to provide local deformation of the support element material around the slot or recess, without causing deformation or distortion of the whole support element and without causing distortion of the screen wire. The downstream section of the screen wire, inserted in the slot or recess, may be shaped in the slot or recess region to provide a space for deformed material and provide a re-entrant feature, so as to strengthen the joint. The deformation of the side surfaces is then adapted to lock the shaped wire in the slot or recess. Naturally, if the slot is made as an opening into the cavity then both the base portion of the wire and the slot wall material may be deformed to provide a joint.

In a screen cylinder according to the invention the support element is preferably a sheet metal plate rolled to a cylindrical drum and provided with a plurality of screen wires fastened thereon. The screen wires may be fastened to the inner or outer periphery of the support element. The cross section of the screen wires preferably has a wider section facing the suspension to be screened, so called upstream section, and a narrower section, so called downstream section, protruding into the slots in the support element, for creating a relief channel between adjacent screen wires for the suspension to pass through. The width of the section facing the suspension is typically 2 to 8 mm, preferably 2.8 to 5 mm.

The total thickness of the support plate i.e., the sheet metal plate is typically in the range of 5 to 20 mm, preferably 7 to 15 mm. The dimensions of the screen or filter to be manufactured dictate the other dimensions of the plate. The size of the openings in the support plate is such that it gives a preferable open area of at least 50%, more preferably between 50 and 85%. The part of the land areas between the openings, which comprise the grooves should, preferably, have a width of 7 mm or more to make the groove and fastening to the screen wires via the groove strong enough. Naturally, the required width of the land area depends also on the length of the land area as well as on the thickness of the support plate, and on the 'density' of the land areas i.e., the distance between neighboring land areas. When using the support plate as a support cylinder in a screen cylinder of pulp and paper industry, the land areas form a strong and rigid network that carries both the mostly compressive axial load originating from the fastening of the screen cylinder in the screening apparatus, and pulsing radial load created by the rotor rotating inside the screen cylinder.

The following dimensions apply best to the embodiments discussed in FIGS. 1–7, since in the present invention with a support plate having openings of various shapes; the dimensions of the land areas may change continuously, whereby any detailed information cannot be given. However, some of the following dimensions may be applicable in the support plate, too, like for instance the groove depth, or the supporting slots depth. Also one reason why the more detailed dimension cannot be applied is that in the present invention the size of the openings may change along the length, or width of the support plate, whereby the requirements set for the dimensions of the land areas left between the openings change, too. In other words, simple rule, the larger openings, the larger land areas to carry the load, applies. The cavity or groove in the land areas protrudes typically about 5 to 15 mm, preferably 6 to 10 mm, into the downstream surface of the support plate. The wall thickness on the side/s of the cavity, or groove, may be 1 mm or more, typically about 1–3 mm. The supporting slots typically have a depth $h_2$ corresponding to 0.25 to 0.50 of the total thickness of the support element. The supporting slots thereby may have a depth $h_2$ 0.3 to 0.9 of the height of the screen wires. The slots reach typically 1 to 3 mm deep into the cavity, or groove. Wires having a height of about 5 to 15 mm, preferably about 7 to 12 mm, are supported by the support element. The cross section of the wires has, preferably, a funnel shaped wide upper (i.e. upstream) section, having a width decreasing in the downstream direction from preferably about 3 to 5 mm to about 1.5 to 3 mm in the upper ⅓ to ½ portion of the total height of the wire. The wire is inserted into the supporting slot, which preferably has a funnel shaped upper section corresponding to the form of the wire. The depth of the support slot and/or the funnel shaped upper ends of the slot and the wire determine the depth to which the wire may be inserted into the slot.

A base portion of the downstream end of the wire reaches according to a preferred embodiment of the present invention the cavity, or groove, in the support element. The wire is fixed to the support element, for instance, by providing a deformation to at least a portion of the wire portion reaching into the cavity, so that this deformation prevents the wire from being pulled out of the slot. The deformation may preferably be brought about by mechanically deforming, e.g., by stamping or swaging, at least a portion of the wire within the cavity. Welding, or soldering may alternatively bring about a deformation, according to the present invention. It is also possible, in accordance with the present invention, to fix the screen wires by gluing, bonding or in another similar non-releasable way, in which a fastening material is fixed to the downstream end of the wire, for attaching said wire to the inner walls of the cavity.

Preferably, the supporting slots have a depth corresponding to ⅓ to ⅔ of the height h of a screen wire, whereby ⅔ to ⅓ of a screen wire inserted in a slot will still protrude above the supporting bar. The supporting slots may have a depth of 3–7 mm, e.g., 3.5 mm and the width of the upper portion of a supporting slot (in the longitudinal direction of the U-bar) may be about 1–3 mm, e.g., 1.5 mm. The screen wire may, according to another embodiment of the present invention, be fastened to a supporting slot in a support bar, e.g., a U-bar or a partly solid bar having a cavity, or groove machined therein, by bending at least a portion of the downstream edge or base portion of the screen wire, protruding into the cavity of the support bar. Two preferably parallel notches may be provided perpendicular to the wire in the downstream edge of the wire for providing an easily deformed or bendable flap. The notches are made long enough to enable the flap to be deformed or bent for locking the screen wire in the supporting slot and thereby fastening the wire to the bar.

The present invention is applicable in screen cylinders having inward or outward flow of suspension to be screened. In inward flow screens screen wires are connected to the external surface of supporting plates or cylinders and in outward flow to the inner surface of the plates or cylinders respectively. The present invention provides a substantially improved screening device and method of manufacturing and assembling such a device. The invention particularly provides an improved method of manufacturing a screening device, so that accurate and uniform screening slots, i.e., good tolerance, with very small widths may be manufactured. The new screening device provides a method of manufacturing a strong screening device with a minimum of burrs or other protruding elements causing accumulation of fibers.

BRIEF DESCRIPTION OF THE DRAWINGS

The invention will be discussed in more detail in accordance with enclosed drawings in which:

FIGS. 7a to 7d show schematically the assembly steps of filter wires being connected to a support bar in an assembly machine with tooling for deformation of base portions of the filter wires;

DETAILED DESCRIPTION OF THE INVENTION

Figure 1:
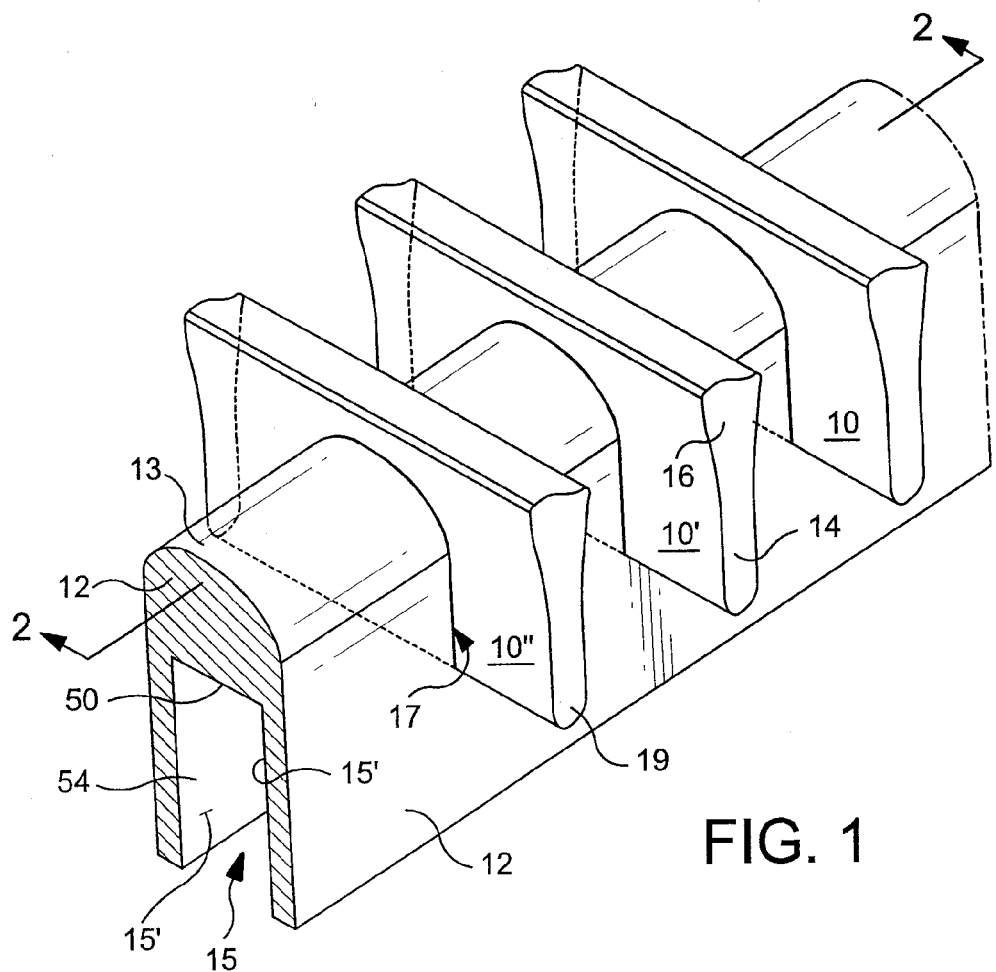
FIG. 1 shows schematically a top side view of screen wires positioned onto a support element according to an embodiment of the present invention discussed in a parent patent, U.S. Pat. No. 6,426,003.

FIG. 1 shows schematically a top/side view of a portion of a screening device according to a preferred embodiment of the present invention. In FIG. 1, three filter wires 10, 10' and 10" are positioned onto a partly solid support bar 12, having an elongated cross section with a rounded top part 13, facing accept flow, and a bottom part with a cavity 15, having side walls 15', therein.

The filter wires 10, 10',10" have narrow lower parts 14, i.e., down-stream portions, and funnel shaped upward widening top parts 16, i.e., upstream portions. The wires are mounted onto the support bar by inserting the narrow lower parts 14 in slots 17 formed through the top or upstream side of the support bar 12. The slots 17 are substantially perpendicular to the longitudinal axis of the support bar 12. The slots 17 are also substantially perpendicular to the top surface of the support bar, for the filter wires to reach radially outward from the support bar.

Figure 2:
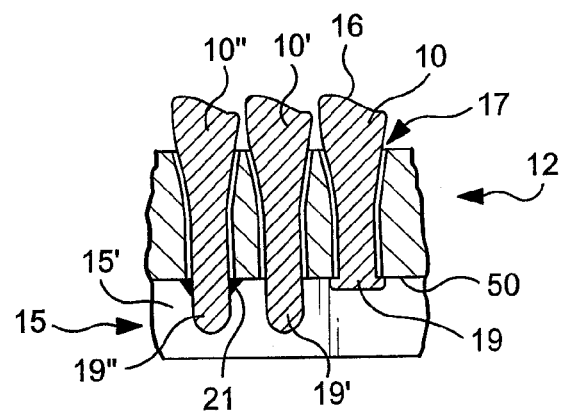
FIG. 2 shows a longitudinal cross section of a portion of the support element in FIG. 1 with three screen wires supported thereon.

The bottom edges 19 of the filter wires 10–10' reach into the cavity 15 in the bottom part of the support bar as can be better seen in FIG. 2. FIG. 2 also shows that the funnel shaped top parts of the wires 10, 10' and 10" are adapted to fit into similarly formed funnel shaped upper parts of the slots 17.

In FIG. 2, wire 10' represents a wire positioned in a slot 17, but not yet fixed thereto. Filter wires 10 and 10" have been fastened to the support bar 12 according to different embodiments of the present invention, for exemplary purposes only. Wire 10 has been fixed to the slot 17 by mechanical deformation of the bottom wire edge 19". The edge 19' has been deformed, so that the width of the edge exceeds the width of the slot 17, thereby preventing the wire from being pulled out through the slot.

Wire 10" is fastened by welding. A slight deformation of the edge 19 of the wire 10" takes place when welding the wire to the side wall 15', by welds 21 forming on the edge. The welds prevent the base portion or edge of the wire from being pulled out of the slot. Different types of welding may be used such as laser, TIG, or plasma welding. Only relatively small amount of heat is needed for welding a thin wire edge to a support bar, the wire edge having a rather small material thickness. Therefore, distortions can be prevented in the method according to the present invention. Further advantage is achieved by the welding being, according to the present invention, performed on the cavity side of a support bar, at a location not coming in contact with fibre suspension to be screened and therefore not causing trouble should fibers gather on the welds.

Figure 3:
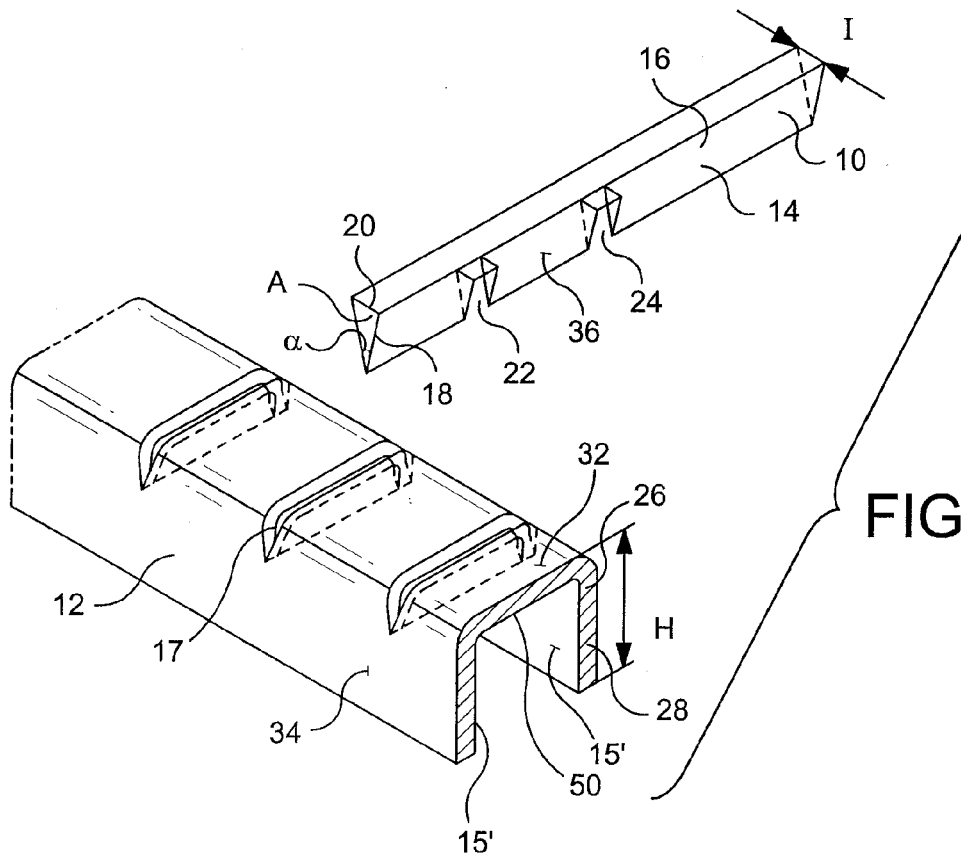
FIG. 3 shows schematically a top side view of a filter wire when being positioned onto a support element according to another embodiment of the present invention.
Figure 4:
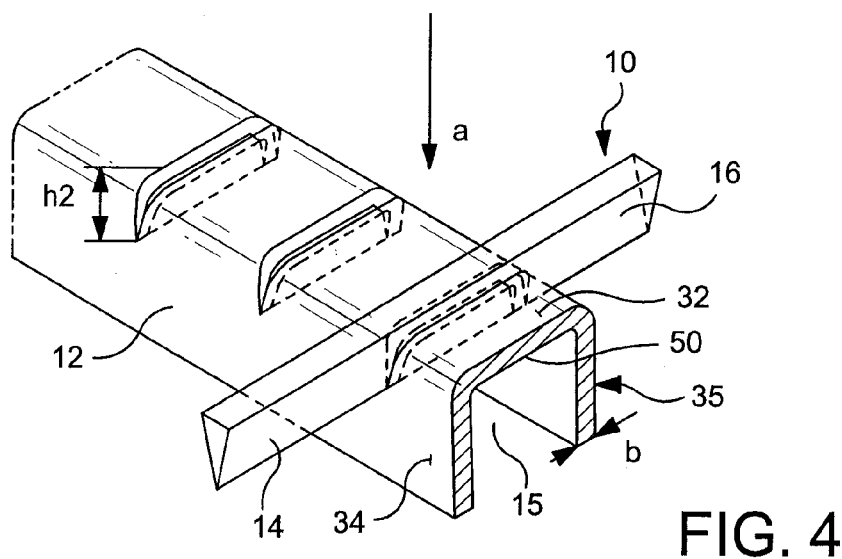
FIG. 4 shows the filter wire according to FIG. 3 positioned on the support element.

FIGS. 3 and 4 show schematically a top side view of a filter wire 10 and a support element 12, according to another embodiment of the present invention. FIG. 3 shows the filter wire 10, which has the form of a triangular bar, being positioned onto a support element 12, which in this embodiment is a U-bar. The filter wire 10 has a triangular cross-section A, having two long sides 18 and a short side 20.

The filter wire 10 has an upstream portion 16 and a downstream portion 14. Two notches 22 and 24, at a distance of about 8.5 mm from each other, are machined in the downstream portion 14 or the downstream edge of the filter wire. The notches are here made before positioning the filter wire onto the U-bar. The notches could be made later when the filter wire is already positioned on the U-bar, if desired.

The U-bar has a first portion 26 or middle portion in which the bar is bent or angled, and a second supporting body portion 28. The support element is positioned in a screening device so that the first portion 26 faces the accept suspension flowing in the direction shown by arrow a (FIG. 2). A cavity 15 is formed within the U-bar, the cavity being open to the downstream side of the suspension passing the U-bar. The cavity is more or less in the blind of or covered from the suspension passing the external side of the U-bar. The cavity may, if desired, be covered e.g. by a filler, a metal strip or by a ring after joining the wire to the support bar. This also adds strength and stiffness of the construction.

A plurality of through openings, supporting slots 17, is cut through the middle portion 26, i.e., the middle surface 32 and a portion of the side surfaces 34 and 35, of the U-bar. The supporting slots are cut straight through the material to form through openings between the upstream side of the U-bar and the cavity 15. The supporting slots 17 formed have a triangular cross section of the same shape as the cross section of the filter wire 10 to be connected thereto, to adapt the supporting slot to receive the wire. It can be seen, in FIGS. 3 and 4, that the form of the cut in the side surface 34 of the U-bar is similar to the cross section of the downstream edge 14 of the filter wire.

FIG. 4 shows the filter wire 10 positioned in the supporting slot 17. The notches 22 and 24 (not shown) are located within the cavity 15 or the U-bar, the ends of the notches reaching almost to the inner side surface of the cavity.

As seen in each of FIGS. 1 through 4, the cavities 15 of the substantially U-shaped supporting elements 12 each have a substantially flat end surface 50, and substantially flat side surfaces 15' which are substantially perpendicular to the end surface 50. The wires 14 are deformed so that the base portions thereof (see 19 in FIG. 2 for the clearest illustration) are locally deformed into engagement with the substantially flat end surface 50. This enhances the secureness of the deformation, and allows the screening device, for example, in the form of a conventional screen cylinder mounted in a conventional pressure screen, to withstand the pluses and static pressures that it is subjected to, while maintaining the screening opening/slots tolerances at a level of plus or minus 0.3 mm or less.

Figure 5:
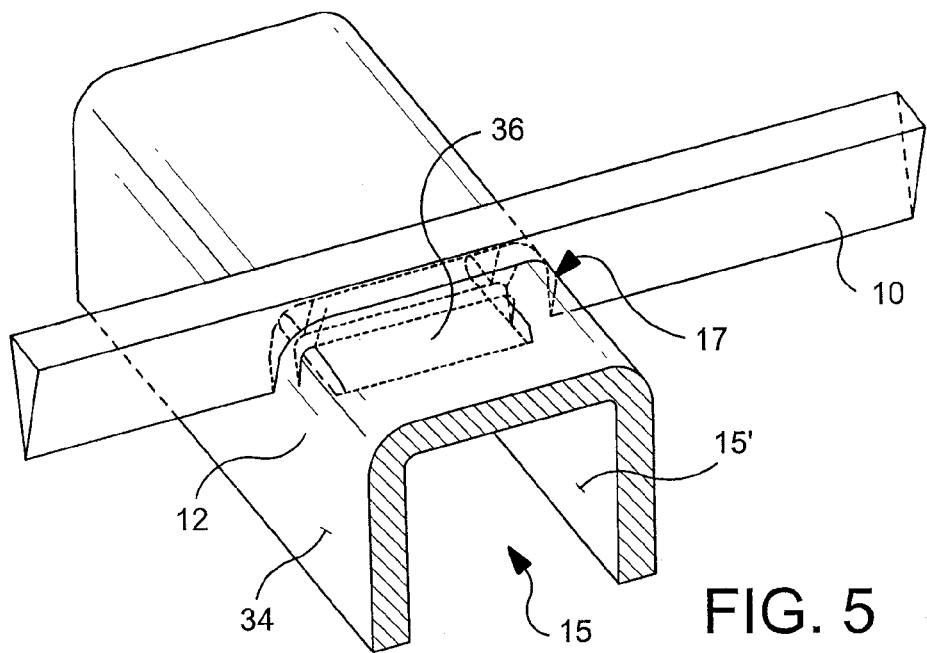
FIG. 5 shows the filter wire according to FIG. 3 fastened to the support element.
Figure 6:
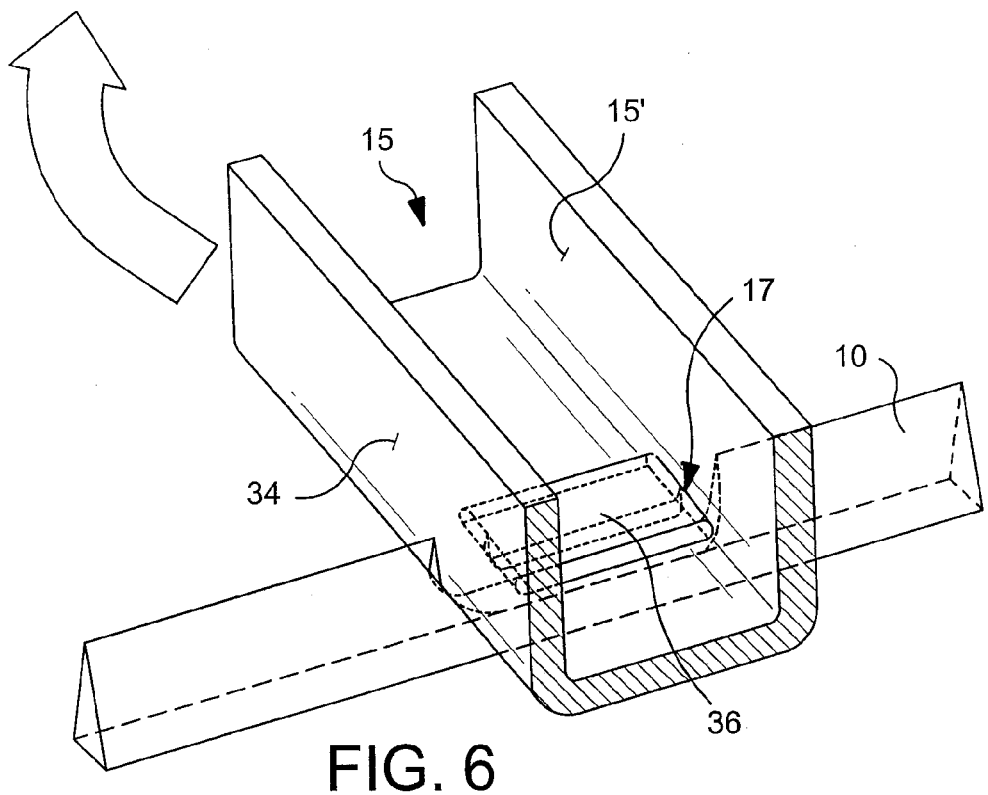
FIG. 6 shows the elements of FIG. 5 upside down.

FIG. 5 shows the filter wire 10 fastened or locked to the U-bar 12. A flap 36 (shown by broken line) formed in the filter wire edge between notches has been bent towards the innermost side surface 15' of the cavity in the U-bar, whereby the flap 36 locks the filter wire 10 at the U-bar, the flap 36 preventing the wire edge from being detached from the U-bar. FIG. 6 shows an upside-down view of the support bar and the filter wire connected thereto in FIG. 5. The flap 36 in the filter wire edge is seen protruding through a supporting slot 17 into the cavity in the U-bar and being bended against the inner surface of the U-bar.

FIGS. 7a to 7d show fixing of filter wires into supporting slots in a support bar 12 by deformation of base portion 19 of filter wires 10. In FIG. 7a, the support bar 12 is shown in section through its upper surface whilst positioned within an assembly machine with tooling 40, 42. The slots 17 in the upper surface of the support bar are clearly visible. Assembled and fixed filter wires 10 are shown on the right side or the exit side of the machine. The upper tool 42 has the facility to move vertically and is contoured or formed on the surface to match any corresponding contour or shape of the filter wires. The tool 40 incorporates the deformation tool profile 44, required to deform the base portion of the filter wire to produce the joint. In FIG. 7a, a filter wire 10a is already inserted in a slot 17 and another filter wire 10b is shown being moved into position ready for fixing.

In FIG. 7b, simultaneous movement of the upper tool 42 and the lower tool 40 creates a deformation force to upset the base portion 19 of the filter wire 10a and creates a joint. Whilst the filter wire 10a is being deformed the adjacent wire 10b is being clamped firmly in its slot 17 to prevent deformation of the slot or support bar under the loads of assembly.

The base portion of the filter wire 10a is deformed on the cavity side of the support bar 12, to increase the material thickness of the base portion of the wire section protruded into the cavity so that a deformed portion 46 is formed. The deformed portion is wider than the width of the supporting slot preventing the base portion of the wire to re-enter the slot and thereby locks the wire at the bar. The deformation may be made rather easily with the tool 44 pressing the thin edge of the wire, while simultaneously supporting the upper end 16 of the wire against e.g., an anvil 42'.

In FIG. 7c, the upper tool 42 and lower tool 40 part and allow the upper support bar to index forward taking with it the already fixed filter wires and positioning the next filter wire 10b in the tooling ready for assembly. In view 7d, the index of support bar is completed and the new filter wire 10b is in position ready for deformation. An empty slot is now available into which the next filter wire can be positioned.

In FIGS. 8a to 8e, a new type of a support structure for screen or filter wires has been shown in a schematical manner. The support structure consists of a sheet metal plate 60 into which openings 62 of desired shape have been machined. The machining leaves solid land areas 64 between the openings. The shape of the openings 62 may be whatever appropriate shape including round, elliptical, triangular, quadrangular, pent angular, and heptangular shapes as few preferred alternatives. The purpose of the openings 62 is to ensure sufficient open area for the screen, or filter, and the purpose of the land areas 64 between the openings is to provide sufficient support for the screen wires. Thus, the land areas 64, or rather part of such, correspond to the support bars of the previous embodiments. But in addition to supporting the screen wires in circumferential, and radial direction, the land areas also form an axial support carrying a substantial part of the axial load subjected to screen wires.

The openings 62 may be arranged in straight circumferential rows (FIGS. 8a, and 8b) along the side edges 66', 66" of the sheet metal plate, or the openings may as well be positioned staggered to allow a somewhat more evenly spread open area. The openings may also be arranged in rows in a direction at a sharp angle to the side edges of the plate so that the land areas, or passages, between the openings are in the same sharp angle to the side edges (shown in FIG. 8c). A preferred feature of a part of the land areas 64 is that it allows straight grooves 70 to be machined across the plate. The grooves 70 should preferably be substantially U-shaped so that the groove has a bottom surface, and two side surfaces, though also grooves having a bottom surface and only one side surface will do, too.

A further feature, which has not been discussed above, should be taken into account. The size as well as the shape or the "density" of the openings may vary across the support plate. Thus, it is possible, that, for instance, in a screen cylinder using the support plate of the present invention, the openings in the upper section of the screen cylinder (in the inflow end of the cylinder) are larger, or the "density" of the openings is higher, or the shape of the openings is such that it gives more open area at the inflow end of the cylinder. In a corresponding manner, the open area of the support element can be regulated in the manufacturing stage of the screen drum.

Figure 8A:
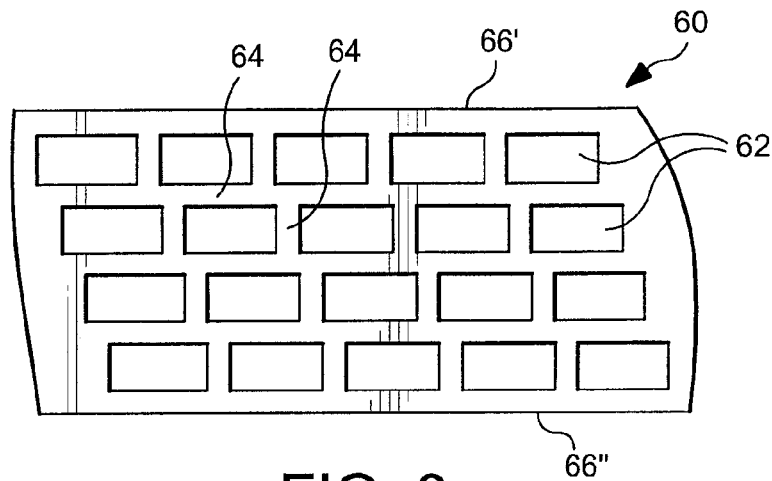
FIGS. 8a to 8c show plan views of a sheet metal plate perforated in accordance with three embodiments of the present invention.
Figure 8B:
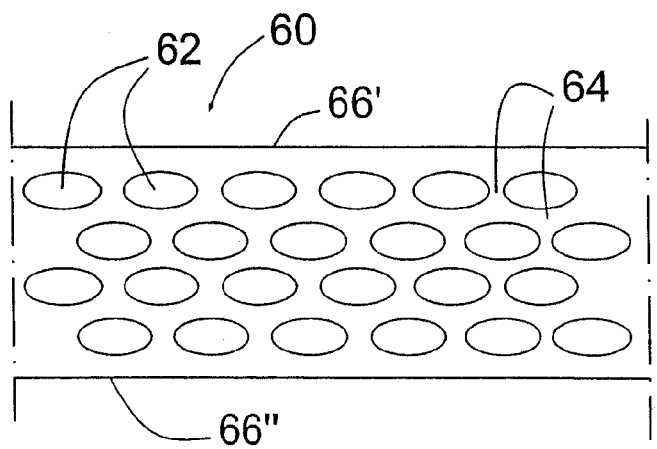
Figure 8C:
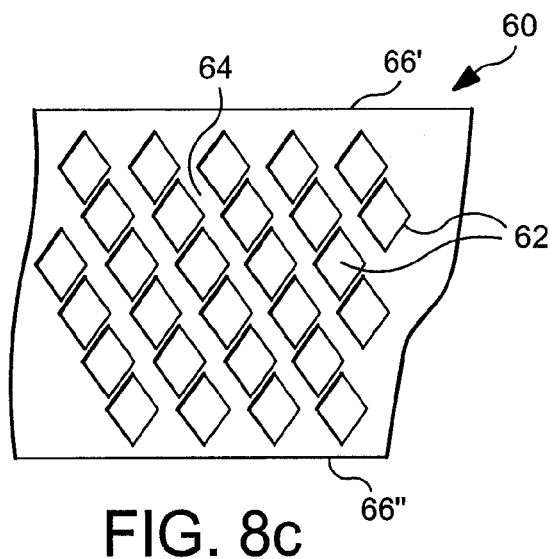
Figure 9A:
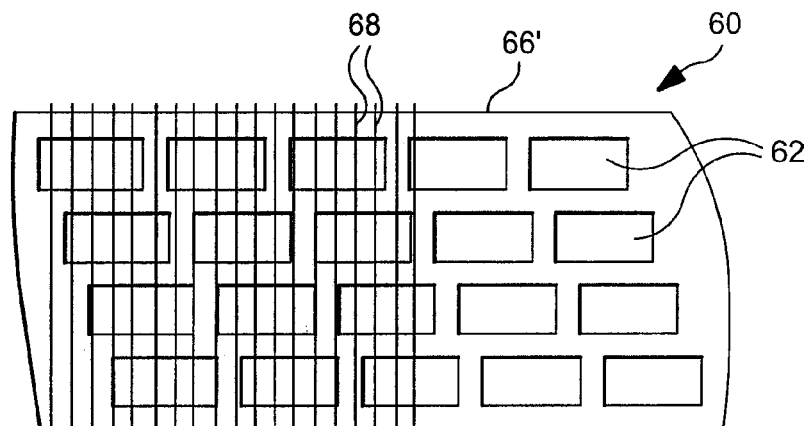
FIGS. 9a and 9b show the sheet metal of FIG. 8a (prior to bending in cylindrical form) provided partially with slots in accordance with two embodiments of the present invention.
Figure 9B:
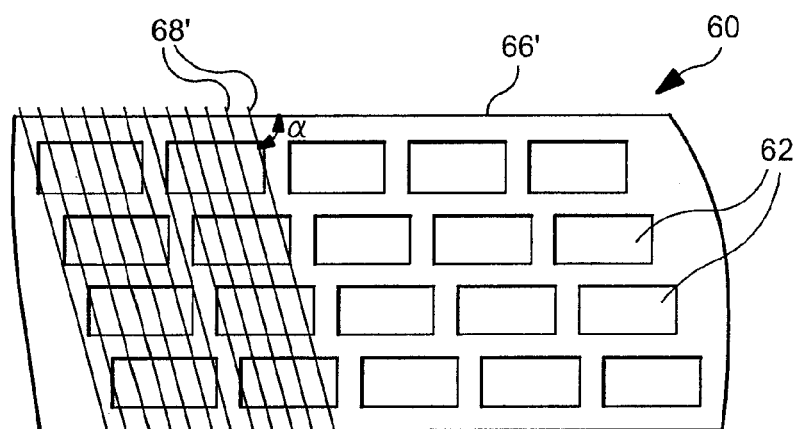
Figure 14:
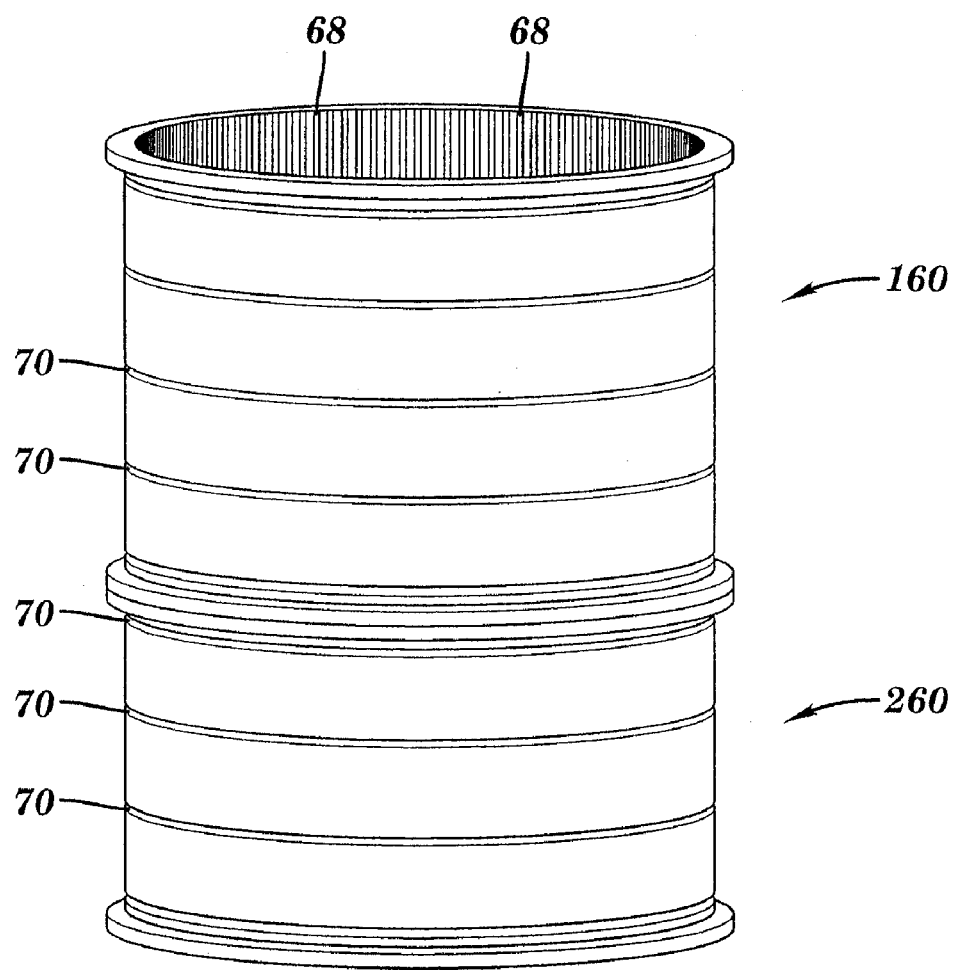
FIG. 14 shows a screen cylinder support structure made of two support cylinder sections positioned one on top of the other.

FIG. 9a shows schematically the perforated sheet metal plate 60 before bending to a cylindrical form shown in FIG. 8a into a part of a first surface of which blind slots 68, or recesses have been machined. The blind slots 68 extend to a certain depth of the plate, preferably in a direction perpendicular to the plate surface. It is, of course, possible to machine the blind slots 68 in a direction deviating to some degree from the perpendicular direction. The slots 68 extend across the plate 60 so that screen wires may be inserted easily into the slots 68. The direction in which the slots 68 extend across the plate 60 may be either perpendicular to a side edges 66', 66" of the plate 60, which would mean that the screen wires would be positioned in axial direction in a screen cylinder rolled from the sheet metal plate 60. However, it is also possible, like. FIG. 9b shows, to position the blind slots 68' in a direction not perpendicular to the side edges 66', 66", but at an angle, alpha, to said side edge, which corresponds to the circumferential direction of a rolled screen cylinder. Thus, by means of the invention it is easy to arrange the screen wires to any desired direction. Also, the invention makes it possible to build a screen cylinder from two or more cylinder sections 160, 260 (see FIG. 14) arranged one on top of the other so that the direction of the screen wires is different in at least two sections. The spacing between adjacent slots defines alone the pitch of the screening openings, and together with the width of the screen wires the width of the screening openings.

Figure 10A:
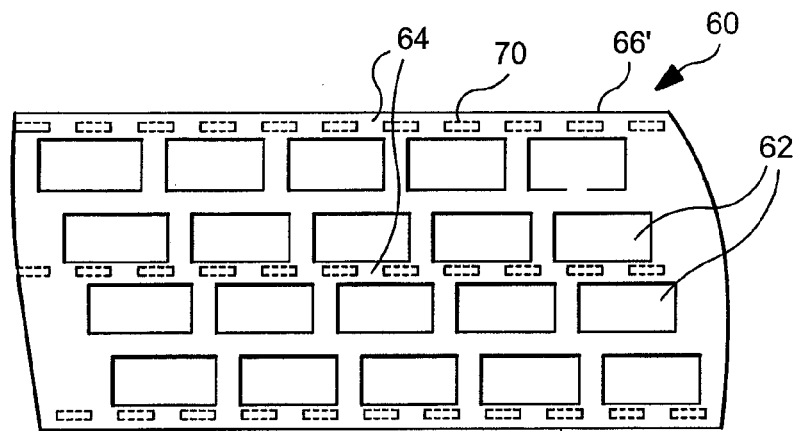
FIGS. 10a and 10b show the sheet metal plate of FIG. 8a and FIG. 8c provided with grooves in accordance with yet another embodiment of the present invention.

FIG. 10a shows schematically the perforated sheet metal plate 60 of FIG. 8a (before bending to a cylindrical form) provided with grooves 70 in the second (outer in FIG. 8a) surface thereof. The grooves 70 correspond to the cavities of the embodiments illustrated in FIGS. 1 through 7. FIG. 10a shows how the openings 62 have been arranged in "horizontal" rows, i.e., rows parallel to one side edge 66', 66" of the sheet metal plate 60, such that the grooves 70 machined in the land areas 64 parallel to the side edges 66', 66" of the sheet metal plate 60 can be parallel to the side edges 66', 66", too. This configuration of the openings 62 ensures that the grooves 70, if and when the plate has been rolled into a cylinder, and provided that the edges 66', 66" form the ends of the screen cylinder, extend in circumferential direction, whereby the fastening of the screen wires via the grooves 70 can be easily done automatically.

It should be understood that though FIG. 10a shows the grooves 70 only in every second "horizontal" land area 64, it is just up to the "vertical" distance between the land areas 64 whether the screen wires need to be fastened to each land area 64 or whether fastening to every second, or to every third land area 64 is sufficient.

FIG. 10b shows, again schematically, how the grooves 70' can be machined in land areas 64', which are not positioned parallel to the side edges 66', 66" of the sheet metal plate 60. The angular position of the grooves 70', naturally, depends on the direction of the land areas 64', which, further, depends on the pattern of the openings 62 in the sheet metal plate 60.

In other words, when designing the pattern of openings 62, the final use of the sheet metal plate 60, as a screen or filter cylinder, should be known so that the openings 62, and especially the land areas 64 between the openings 62 can be arranged such that the grooving of the land areas 64, and fastening the screen wires by means of the grooves 70 could be done in an optimal way. A basic principle is that the direction of the grooves 70 should be transverse to the direction of the screen wires. However, whether the grooves 70 should be at right angles to the screen wires or at a sharp angle thereto depends on the exact method the screen wires are attached to the grooves 70.

Figure 10B:
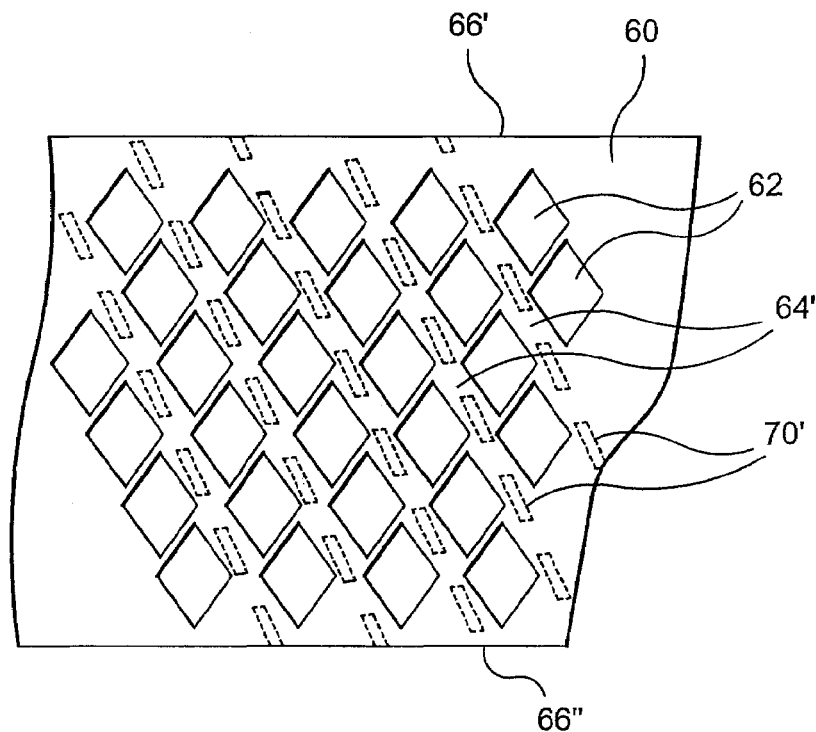
Figure 11:
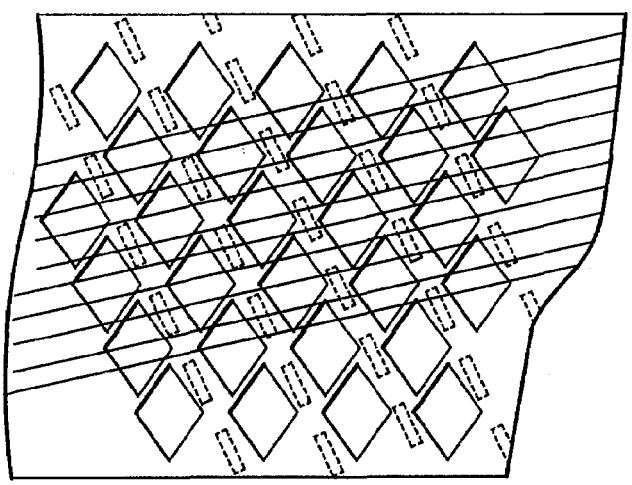
FIG. 11 shows the sheet metal of FIG. 10b provided with slots and screen wires therein in accordance with still one more embodiment of the present invention.

FIG. 11 shows schematically the support plate of FIG. 10b provided with slots 68' for and the screen wires 72 in the slots. In accordance with the FIG. the grooves 70 are inclined in relation to the side edges 66', 66" of the support plate 60. Now, in this embodiment, as, in fact, in all embodiments the slots 68' intersect the grooves 70, otherwise the fastening method of the invention would not work. However, since the grooves 70 are inclined from the "horizontal" (parallel to the edges 66', 66") direction also the slots 68 and screen wires 72 are inclined. Thus, in addition to a screen cylinder having substantially axially oriented screen wires, also inclined, spiral or, as a specific embodiment, circumferential screen wires can be used. Thus, the desired direction of the screen wires dictates the direction of the grooves, which further defines the positioning of the land areas, which finally determines the pattern the openings have to be arranged into. In some cases, the direction of the screen wires has an effect on the shape of the openings machined into the sheet metal plate.

Figure 12:
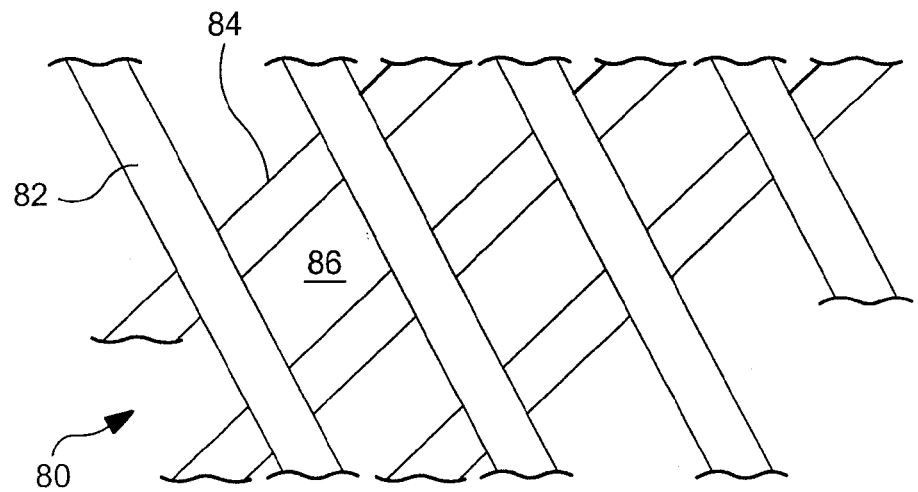
FIG. 12 shows in a schematical manner yet one more embodiment of the invention, where the sheet metal plate of the embodiments discussed in connection with FIGS. 8 to 11 has been replaced with sheet metal strips fastened together to form a grid.

FIG. 12 shows another preferred embodiment of the invention. Here, the support element i.e., the sheet metal plate of the embodiments discussed in FIGS. 8–11 has been replaced with a prefabricated grid 80, or grid-like structure formed (as one preferred alternative) of two arrays of sheet metal strips 82 and 84 placed crosswise. In the embodiment of FIG. 12 the strips 82 are long, and extend, preferably, across the entire support element, either parallel to the side edges of the support element or at a sharp angle thereto (shown in FIG. 12). The strips 84 are short, and extend only between two adjacent, preferably parallel strips 82. The strips 84 are at their longitudinal ends fastened, for instance, by welding or brazing to the sides of the longer strips 82. The open area between the strips 82, and 84 remains for the openings 86, which, naturally, correspond to the openings 62 of the previous embodiments of the present invention. Thus, the sheet metal strips 82, 84 of this embodiment correspond to the land areas of the earlier embodiments, and can be called as such where appropriate.

Figure 13:
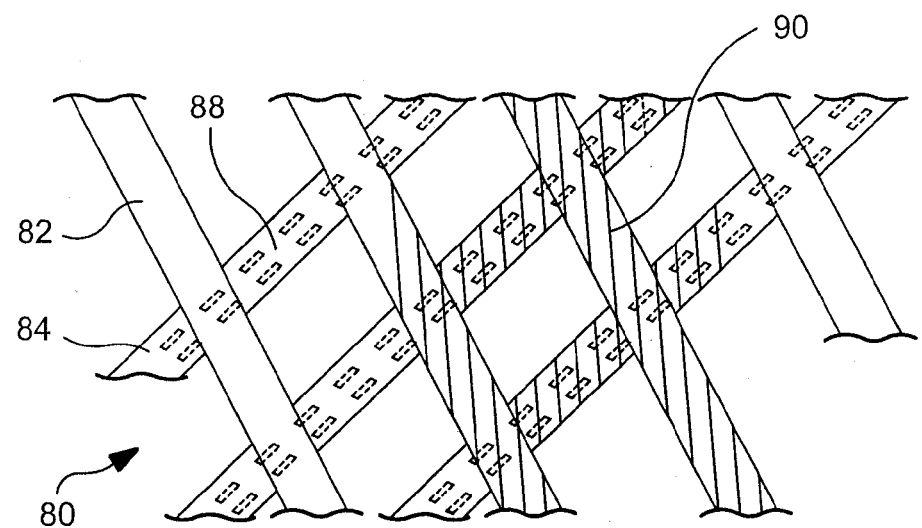
FIG. 13 shows the grid of FIG. 12 provided with grooves and supporting slots.

FIG. 13 shows the prefabricated grid of FIG. 12 provided with grooves 88 on the backside surface thereof. The grooves 88 have been provided in the shorter strips 84, and across strips 82. However, the grooves may as well be provided in the longer strips 82. Also, the grooves could as well be arranged in both strips if such is considered necessary.

A part of the front surface of the support element is provided with supporting slots 90 for the screen wires. Since the strips 82 and 84 are in the same plane, the slots are machined into both strips. The direction of the slots 90 in relation to the strips 82, 84 may, in practice, vary freely. However, a direction parallel to a strip is not practical, as a few screening openings would to totally blocked due to the presence of a strip underneath. Another reason why such is not practical is that the supporting slots 90 cannot be parallel to the grooves 88, but transverse thereto, if grooves are machined in only one of the strips. If the grooves are machined in both strips, then the slots could, in that respect, be parallel with one of the strips, naturally.

As to the embodiments shown in FIGS. 9*a* and 9*b*, as well as in FIGS. 10*a* and 10*b*, it should be understood that the order of machining slots 68, 68' or recesses for the screen wires in the first surface of the sheet metal plate 60 and grooves 70, 70' in the second surface of the sheet metal plate 60 can be freely chosen. Thus, it is possible to machine the grooves 70, 70' first, and then the slots 68, 68', or vice versa. Also, it is possible to first machine the slots and/or grooves, and only thereafter make the perforations through the sheet metal plate.

Further, it has to be understood that, in the case of manufacturing a screen cylinder, the sheet metal plate may be rolled into a cylindrical form in any phase of the manufacturing process. It is possible to cut a plate of required size, roll it into a cylinder, and then start the machining of openings, grooves and slots, in optional order. Likewise, it is possible to do some machining phases first, then roll the plate into a cylinder, and then do the last machining phase/s. For instance, a practical choice could be to machine the openings, and slots in planar object, then roll the plate into a cylinder, and machine the grooves by a turning machine.

A preferred way of manufacturing a screen or filter cylinder is such that the sheet metal plate 60 is readily dimensioned, at least in one direction thereof, to match the dimensions of the screen cylinder. For instance, FIGS. 8*a* through 10*b* have been sketched so that the edges 66' and 66" correspond to the upper and lower ends of a screen or filter cylinder. However, this is just one preferred alternative of manufacturing the screen cylinder. Naturally it is also possible to take a sheet metal plate of standard size, machine openings 62, and possibly also slots and grooves therein, and then cut a support plate of required size from the sheet metal plate.

The openings 62 may be made in the sheet metal plate by means of any well-known means including milling, drilling, punching, laser cutting, and water jet cutting among a number of possible alternatives. The cutting of slots, recesses and grooves is done as explained in connection with the embodiments discussed in FIGS. 1 through 7. In a similar manner the ways of fastening the screen or filter wires into the slots via the grooves has been already discussed earlier in this specification.

Thus, the present invention may be utilized so as to first provide a support plate with openings, and support slots having filter wires connected thereto, which support plate is thereafter formed into a cylinder or alternatively the support plate may first be rolled into a support cylinders whereafter screen wires are positioned into the slots and fastened therein.

Further, it should be understood that by means of the present method of manufacture it is easy to manufacture screen cylinders having different characteristics in different axial positions of the cylinder. In other words, it is possible to build a screen cylinder of several, at least two, different cylinder sections so that the sections are fastened axially on top of each other to form a screen cylinder. In such a cylinder one or more of: inclination of screening openings relative to axial direction, width of the screening openings, pitch of the screening openings, shape and size of the screen wire, open area of the screen cylinder section, and form of the openings in the support element, may vary from one cylinder section to another. Thus, the possibilities the screen device of the invention gives are unlimited. In accordance with yet one more preferred embodiment the ends of the screen cylinder sections are provided with flanges, by means of which the sections are fastened one on top of the other. However, both the lower end of the lowermost cylinder section of a screen cylinder and the upper end of the uppermost section may have different flanges or rings, as they have to be designed separately to match the requirements set by the screening apparatus for the fastening of the screen cylinder thereto.

The present invention provides several advantages over prior art screening devices and methods of manufacturing them. Screening devices having a strong construction may easily and cost-effectively be manufactured according to the present invention. The screening devices manufactured are able to withstand pulses and static pressure and simultaneously keep screening opening tolerances at an optimal level, preferably +−0.05 mm or less. The screening device according to the present invention does not have burrs or other elements, to which fibers are easily attached and accumulated. The present invention thereby provides a method for manufacturing screens with supporting slot widths between 0.1–0.5 mm, even <0.1 mm.

The scope of the present invention is not intended to be limited by the exemplary embodiments discussed above. The intention is to apply the invention broadly according to the scope of the invention as defined by the appended claims. It is e.g., not necessary to provide notches, as shown in FIGS. 3 to 6, in the filter wires, but FIGS. 1 to 2 embodiment may be preferred in most cases.

Finally, it should also be understood that though the above-discussed embodiments teach the use of the screening device in screening fiber suspensions, the present invention is also applicable in the manufacture of screens or filters of sturdier structure. It is, thus, possible that the method of the present invention is applied in making screening or filtering plates for cellulose digesters (for example the screen shown in FIG. 8*a*) to be used for separating spent liquor from the chips in the digester. Corresponding other uses are, of course, possible, too. In such a use the dimensions of the screens or filters are totally different from the ones discussed in the above specification, but still the basic features of the method and screening device discussed in the appended claims are applicable.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A screening device comprising: a plurality of screen wires each comprising a first section and a second section opposite said first section, said second section having a base portion; at least one support element having an upstream surface and a downstream surface, a plurality of openings through said element, a plurality of land areas between said openings, a plurality of slots in said upstream surface, and a plurality of grooves in said land areas on said downstream surface in open communication with said slots; and said second sections of said screen wires received by said slots so that said base portions extend through said slots into said grooves, and said wires are supported by said at least one support element so that said wires are substantially parallel to each other and define screening openings therebetween adjacent said first sections thereof; and wherein said wires are fixed to said at least one support element in said grooves.

2. A screening device as recited in claim 1 wherein said grooves are parallel to a side edge of said support element.

3. A screening device as recited in claim 2 wherein said screening device is a screen cylinder, said side edge forming an end of said cylinder.

4. A screening device as recited in claim 1 wherein said grooves are positioned at an angle to a side edge of said support element.

5. A screening device as recited in claim 1 wherein said slots are perpendicular to a side edge of said support element.

6. A screening device as recited in claim 1 wherein said slots are positioned at an angle a to a side edge of said support element.

7. A screening device as recited in claim 1 wherein said screening device is a screen cylinder, and said grooves run circumferentially round the cylinder.

8. A screening device as recited in claim 1 wherein said openings through said support element have been arranged in rows parallel to a side edge of said support element.

9. A screening device as recited in claim 1 wherein said openings through said support element have been arranged such that said land areas between said openings form a straight passage across said support element.

10. A screening device as recited in claim 9 wherein said passage is at an angle to a side edge of said support element.

11. A screening device as recited in claim 1 wherein said screening device is a screen cylinder, and said grooves run spirally round the cylinder.

12. A screening device as recited in claim 1 wherein said screening device is a screen cylinder, and said grooves run from an end of said cylinder to another end of said cylinder.

13. A screening device as recited in claim 12 wherein said screening openings are directed spirally or circumferentially.

14. A screening device as recited in claim 1 wherein said wires are fixed to said at least one support element in said grooves by local deformation of said base portions.

15. A screening device as recited in claim 14 wherein said local deformation comprises an increased material thickness portion of said base portion formed by reciprocation of a tool.

16. A screening device as recited in claim 1 wherein said wires are fixed to said at least one support element in said grooves by bonding or gluing.

17. A screening device as recited in claim 1 wherein said second sections and base portions have a smaller cross-sectional area than said first sections.

18. A screening device as recited in claim 1 wherein said support element has a material thickness of about 5–20 mm.

19. A screening device as recited in claim 1 wherein said screening device is a screen cylinder formed of at least two screen cylinder sections arranged axially one on top of the other.

20. A screening device as recited in claim 1 wherein said support element is made of sheet metal strips fastened together to form a grid-shaped structure.

21. A screening device as recited in claim 1 wherein said support element is made of two arrays of sheet metal strips fastened crosswise together to form a grid-like structure.

22. A screening device as recited in claim 21 wherein said grooves are arranged in at least one array of sheet metal strips.

23. A screening device as recited in claim 1 wherein said screening device is a cellulose digester screen.

\* \* \* \* \*